(12) United States Patent
Chen et al.

(10) Patent No.: US 8,564,755 B2
(45) Date of Patent: Oct. 22, 2013

(54) LIQUID CRYSTAL LENS, CONTROLLING METHOD THEREOF AND 3D DISPLAY USING THE SAME

(75) Inventors: Chih-wei Chen, Taoyuan (TW); Po-chuan Chen, Kaohsiung (TW); Yi-pai Huang, Chiayi (TW); Jian-jun Li, Shenzhen (CN)

(73) Assignee: Shenzhen Super Perfect Optics Ltd., Shenzhen, Guangdong Province (CN)

( * ) Notice: Subject to any disclaimer, the term of this patent is extended or adjusted under 35 U.S.C. 154(b) by 258 days.

(21) Appl. No.: 12/972,465

(22) Filed: Dec. 18, 2010

(65) Prior Publication Data

US 2012/0120333 A1     May 17, 2012

(30) Foreign Application Priority Data

Nov. 16, 2010   (CN) .......................... 2010 1 0546437

(51) Int. Cl.
*G02F 1/1335*   (2006.01)
*G02F 1/1343*   (2006.01)

(52) U.S. Cl.
USPC ................ 349/200; 349/15; 349/141; 348/59

(58) Field of Classification Search
USPC ............................... 349/15, 141, 200; 348/59
See application file for complete search history.

(56) References Cited

U.S. PATENT DOCUMENTS

| | | | |
|---|---|---|---|
| 2008/0007566 A1* | 1/2008 | Park et al. ...................... | 345/606 |
| 2010/0026920 A1* | 2/2010 | Kim et al. ........................ | 349/15 |
| 2010/0157181 A1* | 6/2010 | Takahashi ........................ | 349/33 |
| 2011/0032438 A1* | 2/2011 | Yun et al. ......................... | 349/15 |
| 2011/0084961 A1* | 4/2011 | Son et al. ........................ | 345/419 |
| 2011/0096250 A1* | 4/2011 | Cha et al. ........................ | 349/15 |

\* cited by examiner

*Primary Examiner* — Michael Caley
(74) *Attorney, Agent, or Firm* — Cheng-Ju Chiang

(57) ABSTRACT

The present disclosure provides a liquid crystal lens, a controlling method thereof and a 3-Dimensional (3D) display using the same. The liquid crystal lens includes a pair of electrode structures which are arranged apart from each other; and a liquid crystal layer which is arranged between the pair of electrode structures and includes a plurality of liquid crystal molecules aligned in an initial aligning direction in which the liquid crystal layer has a non-lens effect. The pair of electrode structures are arranged to generate a first electric field which is used to change aligning directions of the liquid crystal molecules to make the liquid crystal layer have a lens effect. The pair of electrode structures are further arranged to generate a second electric field which is used to make the liquid crystal molecules revert to the initial aligning direction.

12 Claims, 6 Drawing Sheets

LIQUID CRYSTAL LENS, CONTROLLING METHOD THEREOF AND 3D DISPLAY USING THE SAME

RELATED REFERENCE

This application claims the priority benefit of China Patent Application No. 201010546437.7 filed on Nov. 16, 2010. The contents of each of the above-mentioned patent applications is hereby incorporated by reference herein in its entirety and made a part of this specification.

TECHNICAL FIELD

The present disclosure relates to a field of liquid crystal technology, and more particularly to a liquid crystal lens, a controlling method thereof and a 3D (3-Dimensioanl) display using the same.

BACKGROUND

Liquid crystal material is widely used in a number of fields with the development of liquid crystal technology.

For example, a conventional optical lens set always includes at least two lenses which are moved cooperatively to achieve an effect of changing focus. During an actual application, such optical lens set usually is massive and has a big bulk, and accordingly brings inconvenience to the user.

A liquid crystal lens is an optic assembly which focuses or diverges light utilizing a birefringent characteristic of liquid crystal molecules and a characteristic of changing arrangement of the liquid crystal molecules with electric-field distribution. The liquid crystal lens can change aligning directions of the liquid crystal molecules via changing an operating voltage, so as to achieve an effect of changing focus. Furthermore, a lightweight and thin characteristic is a big advantage of the liquid crystal lens, so that the liquid crystal lens can obtain an effective effect of changing focus in a limited space.

In prior art, in order to achieve a desired effect of phase retardation, the liquid crystal lens generally needs a thick liquid crystal layer. However, the overly-thick liquid crystal layer may cause a response time of the liquid crystal lens to be excessively long. For example, if the liquid crystal layer has a thickness of 60 μm, the response time thereof would be about 30 seconds and the operating voltage thereof needs to exceed 30 Volts. Although a focusing time of the liquid crystal lens may be improved by changing the operating voltage thereof in the prior art, it is only limited to changing the focusing time of the liquid crystal lens. That is to say, the time spent for the liquid crystal molecules in the liquid crystal lens to revert to an initial aligning direction still is overly long and is not improved. Therefore, it is inconvenient for the user during usage.

Accordingly, one of development directions for liquid crystal technology is how to reduce the response time of the liquid crystal lens, and particularly is to shorten the time spent for the liquid crystal molecules to revert to the initial aligning direction so as to enhance the efficiency of the liquid crystal lens.

BRIEF SUMMARY OF THE PRESENT DISCLOSURE

According to an embodiment of the present disclosure, there is provided a liquid crystal lens. The liquid crystal lens includes: a pair of electrode structures which are arranged apart from each other; and a liquid crystal layer which is arranged between the pair of electrode structures and includes a plurality of liquid crystal molecules aligned in an initial aligning direction in which the liquid crystal layer has a non-lens effect. The pair of electrode structures are arranged to generate a first electric field which is used to change aligning directions of the liquid crystal molecules to make the liquid crystal layer have a lens effect. The pair of electrode structures are further arranged to generate a second electric field which is used to make the liquid crystal molecules revert to the initial aligning direction.

According to an embodiment of the present disclosure, there is provided a liquid crystal lens. The liquid crystal lens includes: a first electrode structure; a second electrode structure which is arranged apart from the first electrode structure; and a liquid crystal layer which is arranged between the first electrode structure and the second electrode structure, and includes a plurality of liquid crystal molecules aligned in an initial aligning direction in which the liquid crystal layer has a non-lens effect. The first electrode structure includes a plurality of first strip electrodes which are arranged apart from each other and extend in a first extending direction. The second electrode structure includes a plurality of second strip electrodes which are arranged apart from each other and extend in a second extending direction which is across to the first extending direction. The second electrode structure is arranged to generate an electric field which has a field direction at least partially parallel to the initial aligning direction during the liquid crystal molecules revert to the initial aligning direction.

According to an embodiment of the present disclosure, there is provided a liquid crystal lens. The liquid crystal lens includes: a first electrode structure; a second electrode structure which is arranged apart from the first electrode structure; and a liquid crystal layer which is arranged between the first electrode structure and the second electrode structure, and includes a plurality of liquid crystal molecules aligned in an initial aligning direction in which the liquid crystal layer has a non-lens effect. The first electrode structure includes a plurality of first strip electrodes which are arranged apart from each other and extend in a first extending direction. The second electrode structure includes a plurality of second strip electrodes which are arranged apart from each other and extend in a second extending direction which is parallel to the first extending direction. An electric field which has a field direction at least partially parallel to the initial aligning direction is generated between the first strip electrodes or between the second strip electrodes during the liquid crystal molecules revert to the initial aligning direction.

According to an embodiment of the present disclosure, there is provided a liquid crystal lens. The liquid crystal lens includes: a pair of electrode structures which are arranged apart from each other; and a liquid crystal layer which is arranged between the pair of electrode structures, and includes a plurality of liquid crystal molecules aligned in an initial aligning direction in which the liquid crystal layer has a non-lens effect. The pair of electrode structures are arranged to generate an electric field which has a field direction at least partially parallel to the initial aligning direction during the liquid crystal molecules revert to the initial aligning direction.

According to an embodiment of the present disclosure, there is provided a liquid crystal lens. The liquid crystal lens includes: a pair of electrode structures which are arranged apart from each other; and a liquid crystal layer which is arranged between the pair of electrode structures and includes a plurality of liquid crystal molecules. The pair of electrode structures are arranged to generate a first electric field which makes the liquid crystal molecules into a first optical state under which the liquid crystal layer has a lens effect. The pair of electrode structures are further arranged to generate a second electric field which makes the liquid crystal molecules into a second optical state under which the liquid crystal layer has a non-lens effect.

According to an embodiment of the present disclosure, there is provided a liquid crystal lens. The liquid crystal lens includes: a pair of electrode structures which are arranged apart from each other; and a liquid crystal layer which is arranged between the pair of electrode structures and includes a plurality of liquid crystal molecules. The pair of electrode structures are arranged to generate a first electric field which makes the liquid crystal molecules into a first aligning state under which the liquid crystal layer has a lens effect. The pair of electrode structures are further arranged to generate a second electric field which makes the liquid crystal molecules into a second aligning state under which the liquid crystal layer has a non-lens effect.

According to an embodiment of the present disclosure, there is provided a controlling method of a liquid crystal lens. The controlling method includes: providing a first electric field which is used to change aligning directions of a plurality of liquid crystal molecules in a liquid crystal layer to make the liquid crystal layer have a lens effect; and providing a second electric field which is arranged to make the liquid crystal molecules revert to an initial aligning direction in which the liquid crystal layer has a non-lens effect.

According to an embodiment of the present disclosure, there is provided a controlling method of a liquid crystal lens. The controlling method includes: providing a first electric field which is used to make a plurality of liquid crystal molecules in a liquid crystal layer into a first aligning state under which the liquid crystal layer has a lens effect; and providing a second electric field which is used to make the liquid crystal molecules into a second aligning state under which the liquid crystal layer has a non-lens effect.

According to an embodiment of the present disclosure, there is provided a 3D display including a liquid crystal lens. The liquid crystal lens includes: a pair of electrode structures which are arranged apart from each other; and a liquid crystal layer which is arranged between the pair of electrode structures and includes a plurality of liquid crystal molecules arranged in an initial aligning direction in which the liquid crystal layer has a non-lens effect. The pair of electrode structures are arranged to generate a first electric field which is used to change aligning directions of the liquid crystal molecules to make the liquid crystal layer have a lens effect. The pair of electrode structures are further arranged to generate a second electric field which is used to make the liquid crystal molecules revert to the initial aligning direction.

BRIEF DESCRIPTION OF THE DRAWINGS

Embodiments of apparatus and method in accordance with the present disclosure will now be described, by way of example, with reference to the accompanying drawings, in which.

Figure 1:
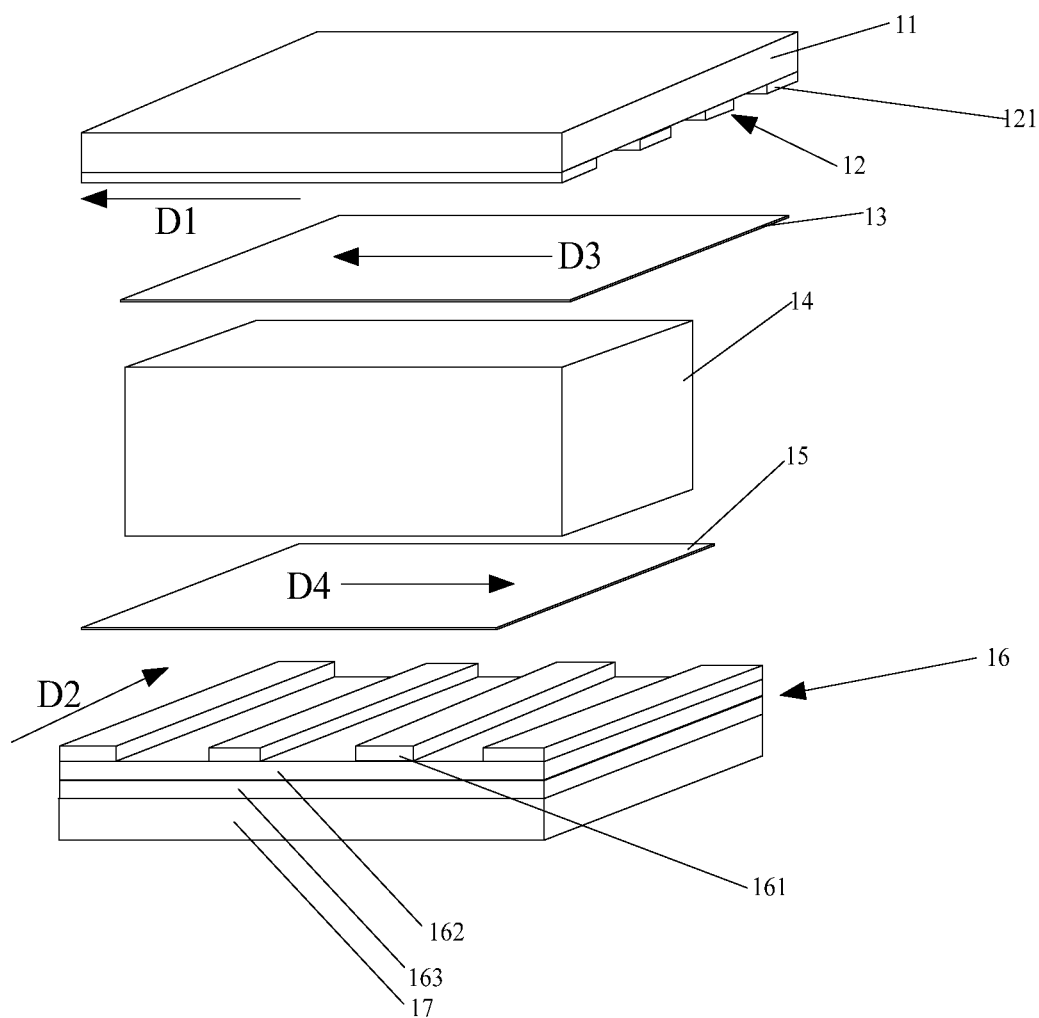
FIG. 1 is a structural view of a first preferable embodiment of a liquid crystal lens according to the present disclosure.

It should be understood that the Figures are merely schematic and are not drawn to scale. In particular, certain dimensions may have been exaggerated whilst other dimensions may have been reduced. It should also be understood that the same reference numerals are used throughout the Figures to indicate the same or similar parts.

DETAILED DESCRIPTION OF EMBODIMENTS

The present disclosure provides a liquid crystal lens including a pair of electrode structures which are arranged apart from each other and a liquid crystal layer arranged between the pair of electrode structures. The liquid crystal layer includes a plurality of liquid crystal molecules.

In embodiments of the present disclosure, the pair of electrode structures are arranged to generate a first electric field which makes the liquid crystal molecules into a first aligning state under which the liquid crystal layer has a lens effect. Moreover, the pair of electrode structures are arranged to generate a second electric field which makes the liquid crystal molecules into a second aligning state under which the liquid crystal layer has a non-lens effect.

Referring to FIG. 1, a first preferable embodiment of a liquid crystal lens according to the present disclosure is shown.

In this first embodiment, the liquid crystal lens includes a first substrate 11, a first electrode structure 12, a first aligning layer 13, a liquid crystal layer 14, a second aligning layer 15, a second electrode structure 16 and a second substrate 17.

The first electrode structure 12 is arranged on the first substrate 11 and includes a plurality of first strip electrodes 121 which are arranged apart from each other and extending in a first extending direction D1.

The second electrode structure 16 is arranged on the second substrate 17 and includes a plurality of second strip electrodes 161, a dielectric layer 162 and a planar electrode 163. The plurality of second strip electrodes 161 are arranged apart from each other and extend in a second extending direction D2. The planar electrode 163 and the second strip electrodes 161 are stacked with and insulated from each other. The dielectric layer 162 is arranged between the second strip electrodes 161 and the planar electrode 163. As appreciated by one skilled in the art, any suitable material may be arranged between the second strip electrodes 161 and the planar electrode 163 to make them be insulated from each other. In this first embodiment, the planar electrode 163 is arranged adjacent to the second substrate 17.

The liquid crystal layer 14 is arranged between the first electrode structure 12 and the second electrode structure 16. The first aligning layer 13 is arranged between the liquid crystal layer 14 and the first electrode structure 12. The second aligning layer 15 is arranged between the liquid crystal layer 14 and the second electrode structure 16.

In this first embodiment, the first extending direction D1 is across to the second extending direction D2, and preferably is perpendicular to the second extending direction D2.

The liquid crystal layer 14 includes a plurality of liquid crystal molecules aligned in an initial aligning direction. The first aligning layer 13 having an aligning direction D3 and the second aligning layer 15 having an aligning direction D4 are arranged cooperatively to make the liquid crystal molecules be aligned in the initial aligning direction. The aligning direction D3 of the first aligning layer 13 and the aligning direction D4 of the second aligning layer 15 are both parallel to the first extending direction D1 through a rubbing alignment process or a radiating alignment process, so that the initial aligning direction of the liquid crystal molecules is parallel to the first extending direction D1.

Preferably, the first substrate 11 and the second substrate 17 are preferably glass substrates. As appreciated by one skilled in the art, they may be any suitable transparent substrates through which light can pass.

Preferably, the first strip electrodes 121, the second strip electrodes 161 and the planar electrode 163 are transparent conductive layers which may be formed from indium tin oxide (ITO) or indium zinc oxide (IZO).

The dielectric layer 162 may be a layer of transparent insulative material, for example SiOx or SiNx.

The working principle of the first preferable embodiment according to the present disclosure is described as follows.

Firstly, a process of generating a first electric field is described in connection with FIG. 2.

Figure 2:
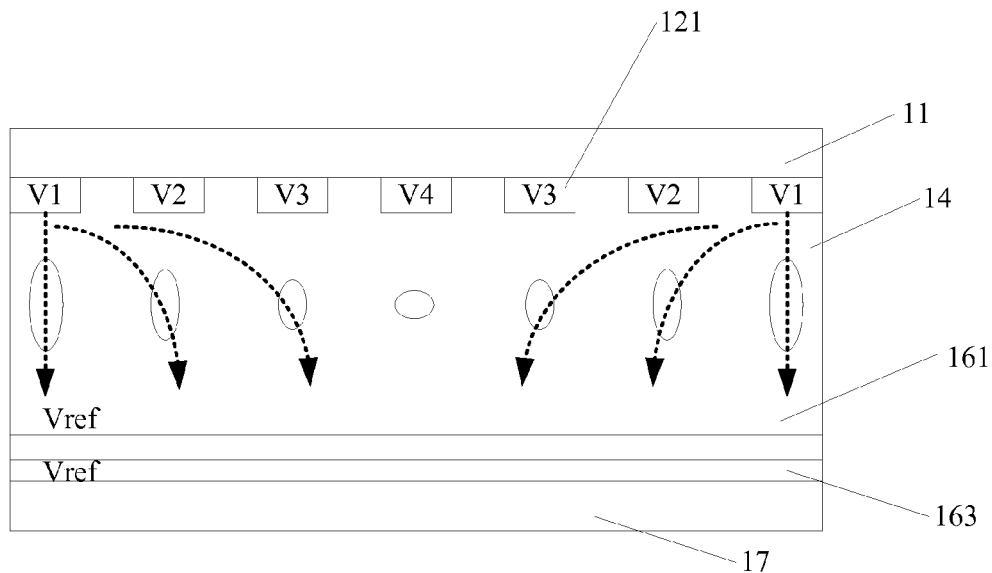
FIG. 2 is a schematic view of a first electric field in the first preferable embodiment according to the present disclosure.

Referring to FIG. 2, a plurality of voltages V1, V2, V3 and V4 are provided on the plurality of first strip electrodes 121, respectively. To ensure that the liquid crystal lens has a preferable lens effect, the voltages V1, V2, V3 are provided symmetrically with respect to the voltage V4. Moreover, a zero voltage or reference voltage Vref is provided on the second strip electrodes 161 and the planar electrode 163. Thus, a plurality of corresponding voltage differences are formed between the first strip electrodes 121 and the second strip electrodes 161 as well as the planar electrode 163. The plurality of voltage differences generate the first electric field in the liquid crystal layer 14. Aligning directions of the liquid crystal molecules in the liquid crystal layer 14 are changed under the first electric field. Accordingly, longitudinal arrangement directions of the liquid crystal molecules in different regions are different, and refractive index of the liquid crystal molecules changes in a parabola profil. As a result, a lens with a center at the first strip electrodes which are provided with the voltage V1 or V4 is formed, so that the liquid crystal layer 14 has a lens effect and hereby achieves a purpose of focusing or diverging.

Seven first strip electrodes 121 provided with corresponding voltages are shown in FIG. 2 for illustrative purpose. It should be understood that this structure is only exemplary and the present disclosure should not be limited thereto. In practice, the number of the first strip electrodes 121 and the voltage values of the volages provided on the first strip electrodes 121 may be adjusted according to desired parameters of the lens. For example, the number of the first strip electrodes 121 may be an odd number, and the voltages may be provided symmetrically with respect to the middle first strip electrode 121, so as to form a lens structure which is symmetrical with respect to the middle first strip electrode 121. Alternatively, the number of the first strip electrodes 121 may also be an even number, and the voltages may be provided symmetrically with respect to the middle pair of first strip electrodes 121, so as to form a lens structure which is symmetrical with respect to the middle pair of first strip electrodes 121.

In this first embodiment, to reduce the response time during which the liquid crystal lens creates the lens effect, the voltages V1, V2, V3 and V4 may be overdrive voltages during the lens effect is formed in the liquid crystal layer. The overdrive voltages V1, V2, V3 and V4 form a plurality of overdrive voltage differences with respect to the zero or reference voltage Vref. The overdrive voltage differences create an overdrive electric field greater than a normal driving electric field in the liquid crystal layer 14, so that changing of alighning directions of the liquid crystal molecules is accelerated under the overdrive electric field. After a suitable period, the overdrive voltages V1, V2, V3 and V4 are changed to stabilizing voltages, so that a plurality of stabilizing voltage differences are maintained in the liquid crystal layer 14. The stabilizing voltage differences may make the liquid crystal layer 14 maintain the lens effect. Because the overdrive voltage differences are higher than the stabilizing voltage differences, the time for creating the lens effect of the liquid crystal lens is greatly reduced.

Secondly, a process of generating a second electric field is described in connection with FIGS. 3-4.

Figure 3:
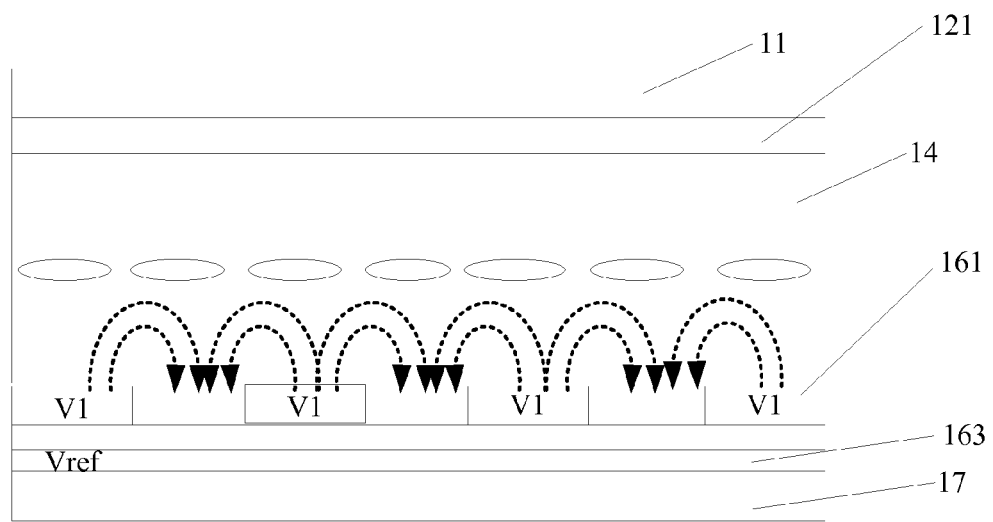
FIG. 3 is a schematic view of a second electric field in the first preferable embodiment according to the present disclosure.

Referring to FIG. 3, a voltage V1 is provided on the second strip electrodes 161, and a zero voltage or reference voltage Vref is provided on the planar electrode 163. In this way, a voltage difference is formed between the second strip electrodes 161 and the planar electrode 163, and a second electric field is accordingly created. The direction of the second electric field is parallel to or at least partly parallel to the initial aligning direction of the liquid crystal molecules, so that the liquid crystal molecules rapidly revert to the initial aligning direction under the second electric field. The liquid crystal layer 14 has a non-lens effect because the liquid crystal molecules in different regions have substantially consistent longitudinal arrangement directions when they are in the initial aligning direction.

Figure 4:
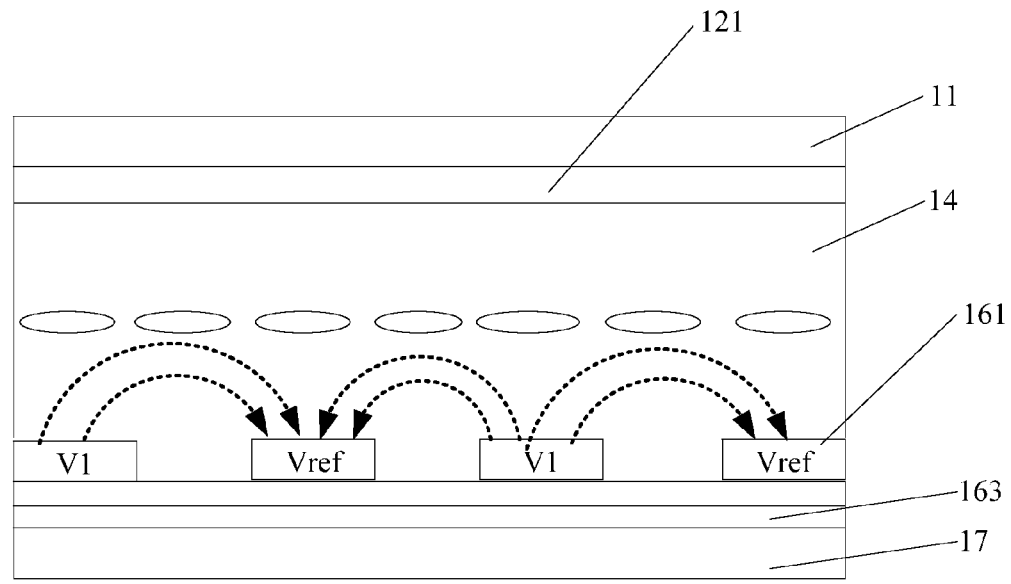
FIG. 4 is another schematic view of a second electric field in the first preferable embodiment according to the present disclosure.

Referring to FIG. 4, another creating manner of the second electric field is shown. A voltage V1 and a zero voltage or reference voltage Vref are alternately provided on the second strip electrodes 161. A voltage difference is formed between the adjacent second strip electrodes 161 and accordingly the second electric field having a field direction which is parallel to or at least partly parallel to the initial aligning direction of the liquid crystal molecules is generated, so that the liquid crystal molecules rapidly revert to the initial aligning direction under the second electric field. The liquid crystal layer 14 has a non-lens effect because the liquid crystal molecules in different regions have substantially consistent longitudinal arrangement directions when they are in the initial aligning direction.

Figure 5:
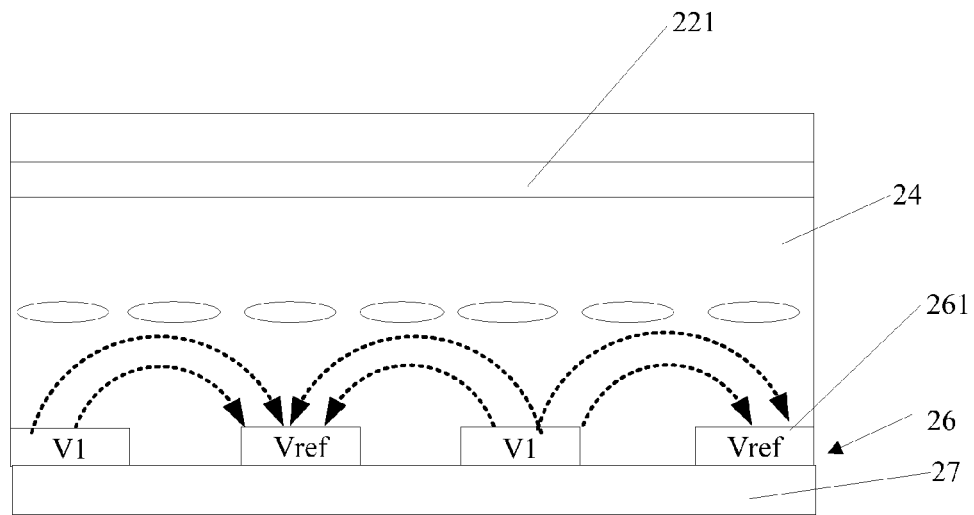
FIG. 5 is a structural view of a second preferable embodiment of a liquid crystal lens according to the present disclosure, in which a second electric field is shown.

Referring to FIG. 5, a structure and a second electric field of a second preferable embodiment of the liquid crystal lens according to the present disclosure are shown.

The liquid crystal lens shown in FIG. 5 is substantially similar to the liquid crystal lens structure of the first embodiment shown in FIGS. 1-4, except that the liquid crystal lens of the second preferable embodiment includes a second substrate 27 and a second electrode structure 26 which includes a plurality of second strip electrodes 261 arranged on the second substrate 27. That is to say, the planar electrode 163 between the second strip electrodes 161 and the second substrate 17 and the dielectric layer 162 in the first preferable embodiment is omitted in the second electrode structure 26.

With changes of structure, corresponding changes of the working principle of the liquid crystal lens of the second embodiment generates are detailedly described as follows.

Firstly, a process of generating a first electric field is described as follows. A plurality of appropriate voltages are provided on a plurality of first strip electrodes 221, for example, the voltages are provided on the plurality of first strip electrodes 221 symmetrically with respect to the middle first strip electrode 221. A zero voltage or reference voltage Vref is provided on the second strip electrodes 261, so that a plurality of corresponding voltage differences are formed between the first strip electrodes 221 and the second strip electrodes 261 and accordingly the first electric field is created in the liquid crystal layer 24 by the voltage differences. Aligning directions of the liquid crystal molecules in the liquid crystal layer 24 are changed under the first electric field. The longitudinal arrangement directions of the liquid crystal molecules in different regions are different, and refractive index of the liquid crystal molecules change in a parabola profile. As a result, a lens with a center at the middle first strip electrode 221 is formed, so that the liquid crystal layer 24 has a lens effect and hereby achieves a purpose of focusing or diverging.

Similarly, in order to accelerate the forming process of the liquid crystal lens, an overdrive scheme similar to the first embodiment may be used in the second embodiment, and is not described in detail herein.

Secondly, a process of generating a second electric field is described as follows. A voltage V1 and a zero voltage or reference voltage Vref are alternately provided on the second strip electrodes 261. In this way, a voltage difference is formed between the adjacent second strip electrodes 261, and the second electric field is created accordingly. The field direction of the second electric field is parallel to or at least partly parallel to the initial aligning direction of the liquid crystal molecules, so that the liquid crystal molecules rapidly revert to the initial aligning direction under the second electric field. The liquid crystal layer 24 has a non-lens effect because the liquid crystal molecules in different regions have substantially consistent longitudinal arrangement directions when they are in the initial aligning direction. In the above manner, a planar electrode and a dielectric layer may be omitted, so that manufacturing steps are reduced.

Figure 6:
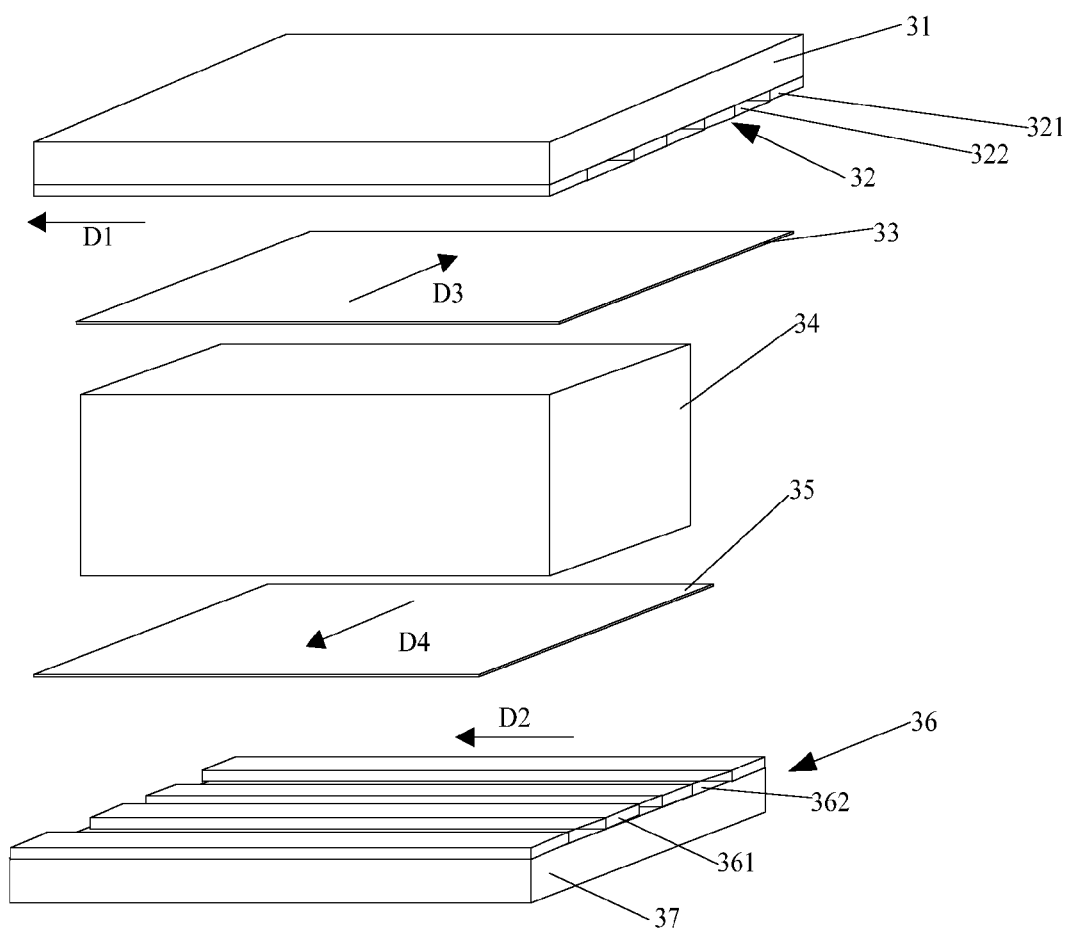
FIG. 6 is a structural view of a third preferable embodiment of a liquid crystal lens according to the present disclosure.

Referring to FIG. 6, a structure of a third preferable embodiment of the liquid crystal lens according to the present disclosure is shown.

In this third embodiment, the liquid crystal lens includes a first substrate 31, a first electrode structure 32, a first aligning layer 33, a liquid crystal layer 34, a second aligning layer 35, a second electrode structure 36 and a second substrate 37.

The first electrode structure 32 is arranged on first substrate 31, and includes a plurality of first strip electrodes 321. The first strip electrodes 321 are arranged apart from each other and extend along a first extending direction D1.

The second electrode structure 36 is arranged on second substrate 37, and includes a plurality of second strip electrodes 361. The second strip electrodes 361 are arranged apart from each other and extend along a second extending direction D2. In this third embodiment, the first extending direction D1 is parallel to the second extending direction D2.

The liquid crystal layer 34 is arranged between the first electrode structure 32 and the second electrode structure 36. The first aligning layer 33 is arranged between the liquid crystal layer 34 and the first electrode structure 32. The second aligning layer 35 is arranged between the liquid crystal layer 34 and the second electrode structure 36.

The liquid crystal layer 34 includes a plurality of liquid crystal molecules aligned in an initial aligning direction. The first aligning layer 33 having an aligning direction D3 and the second aligning layer 35 having an aligning direction D4 are arranged cooperatively to make the liquid crystal molecules be aligned in the initial aligning direction. The aligning direction D3 of the first aligning layer 33 and the aligning direction D4 of the second aligning layer 35 are across to the first extending direction D1, so that the initial aligning direction of the liquid crystal molecules is across to the first extending direction D1. Preferably, the initial aligning direction of the liquid crystal molecules is perpendicular to the first extending direction D1.

Preferably, the first substrate 31 and the second substrate 37 are glass substrates. As appreciated by one skilled in the art, they may be any suitable transparent substrates through which light can pass.

Preferably, the first strip electrode 321 and the second strip electrode 361 are transparent conductive layers which may be formed from indium tin oxide (ITO) or indium zinc oxide (IZO).

The working principle of the third preferable embodiment is described as follows.

Figure 7:
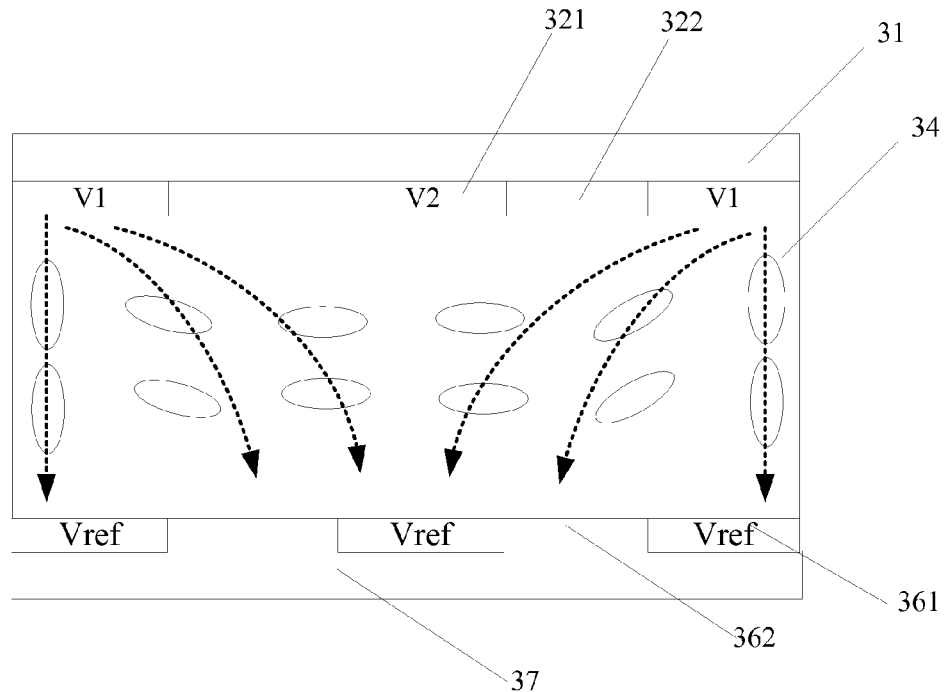
FIG. 7 is a schematic view of a first electric field in the third preferable embodiment according to the present disclosure.

Referring to FIG. 7, a plurality of voltages V1 and V2 are provided on the first strip electrodes 321, respectively. In FIG. 7, the voltage V1 is symmetrical with respect to the voltage V2, so as to assure that the liquid crystal layer 34 has a good lens effect. Furthermore, a zero voltage or reference voltage Vref is provided on the second strip electrodes 361, so that a plurality of voltage differences are created between the first strip electrodes 321 and the second strip electrodes 361 and the first electric field is created hereby. Aligning directions of the liquid crystal molecules in the liquid crystal layer 34 are changed under the first electric field. Longitudinal arrangement directions of the liquid crystal molecules in different regions are different, and refractive index of the liquid crystal molecules changes in a parabola profile. As a result, a lens with a center at the first strip electrodes which are provided with the voltages V1 or V2 is formed, so that the liquid crystal layer 34 has a lens effect and hereby achieves a purpose of focusing or diverging.

Three first strip electrodes 321 provided with corresponding voltages are shown in FIG. 7 for illustrative purpose. It should be understood that this structure is only exemplary and the present disclosure is not limited thereto. In practice, the number of the first strip electrodes 321 and the voltage values of the volages provided on the first strip electrodes 321 may be adjusted according to desired parameters of the lens. For example, the number of the first strip electrode 321 may be an odd number, and the voltages may be provided symmetrically with respect to the middle first strip electrode 321, so as to form a lens structure which is symmetrical with respect to the middle first strip electrode 321. Alternatively, the number of the first strip electrode 321 may also be an even number, and the voltages may be provided symmetrically with respect to the middle pair of first strip electrodes 321, so as to form a lens structure which is symmetrical with respect to the middle pair of first strip electrodes 321.

In the third preferable embodiment, in order to accelerate the forming process of the liquid crystal lens, an overdrive scheme similar to the first preferable embodiment is adopted preferably. That is to say, each of the voltage difference between the first strip electrodes 321 and the second strip electrodes 361 may include an overdrive voltage difference which causes the liquid crystal layer 34 to create the lens effect and a stabilizing voltage difference which cause the liquid crystal layer 34 to maintain the lens effect. The overdrive voltage difference is greater than the stabilizing voltage difference.

Figure 8:
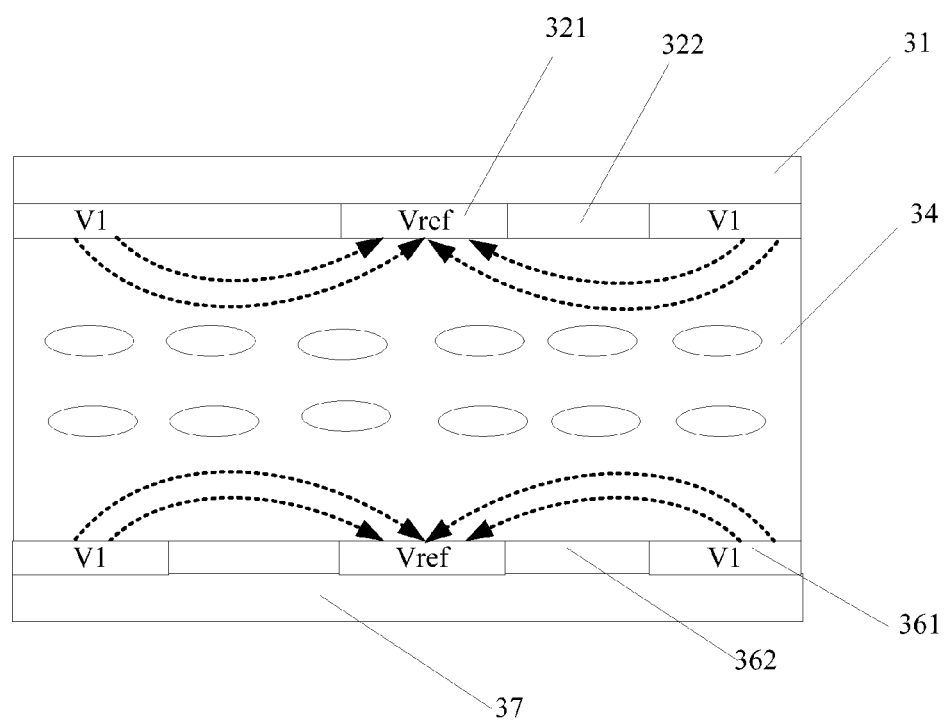
FIG. 8 is a schematic view of a second electric field in the third preferable embodiment according to the present disclosure.

Referring to FIG. 8, a voltage V1 and a zero voltage or reference voltage Vref are alternately provided on the first strip electrodes 321, and the voltage V1 and the zero voltage or reference voltage Vref are alternately provided on the second strip electrodes 361 at the same time, so as to a voltage difference is formed between the adjacent first strip electrodes 321 and between the adjacent second strip electrodes 361 respectively. The voltage difference creates the second electric field in the liquid crystal layer 34. The direction of the second electric field is parallel to or partly parallel to the initial aligning direction of the liquid crystal molecules, so that the liquid crystal molecules rapidly revert to the initial aligning direction of the liquid crystal molecules under the second electric field. The liquid crystal layer 34 has a non-lens effect because the liquid crystal molecules in different regions have substantially consistent longitudinal arrangement directions when they are in the initial aligning direction. Alternatively, the above voltage difference may also be only formed between the first strip electrodes 321 or between the second strip electrodes 361 to achieve the same purpose.

Preferably, the first electrode structure 32 may further include a plurality of first high resistance material layers 322 arranged between the first strip electrodes 321. The second electrode structure 36 may further include a plurality of second high resistance material layers 362 arranged between the second strip electrodes 361. The first high resistance material layers 322 and the second high resistance material layers 362 may cause the electric field to be distributed more evenly. Alternatively, the high resistance material layers may be only formed between the first strip electrodes 321 or between the second strip electrodes 361. The high resistance material layers are also applicable to the first and the second preferable embodiments.

Figure 9:
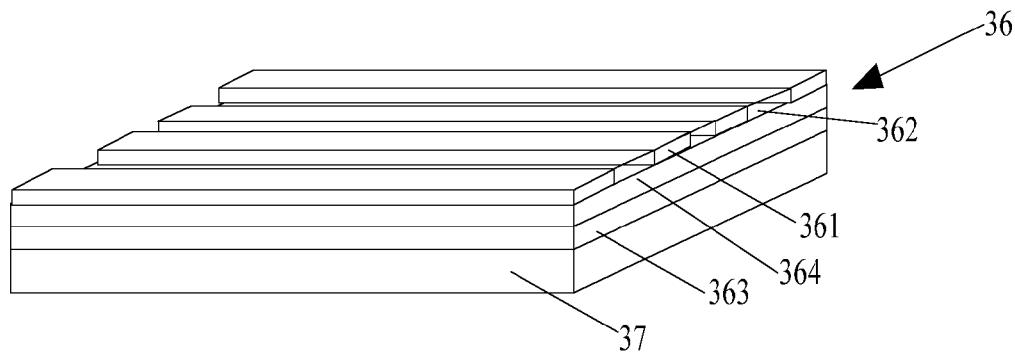
FIG. 9 is another structural view of a partial structure in the third preferable embodiment according to the present disclosure.

Referring to FIG. 9, in the third preferable embodiment, the second electrode structure 36 may further include a planar electrode 363 and a dielectric layer 364. The planar electrode 363 is arranged between the second strip electrodes 361 and the second substrate 37. The dielectric layer 364 is provided between the planar electrode 363 and the second strip electrodes 361, so that the planar electrode 363 is insulated from the second strip electrodes 361. Furthermore, the second electric field may be created by forming a voltage difference between the second strip electrodes 361 and the planar electrode 363, so as to accelerate the reverting process of the liquid crystal molecules. The specific forming process of the second electric field may refer to the description above mentioned in connection with FIG. 4. Similarly, a planar electrode and a dielectric layer may also be arranged in the first electrode structure 31.

Figure 10:
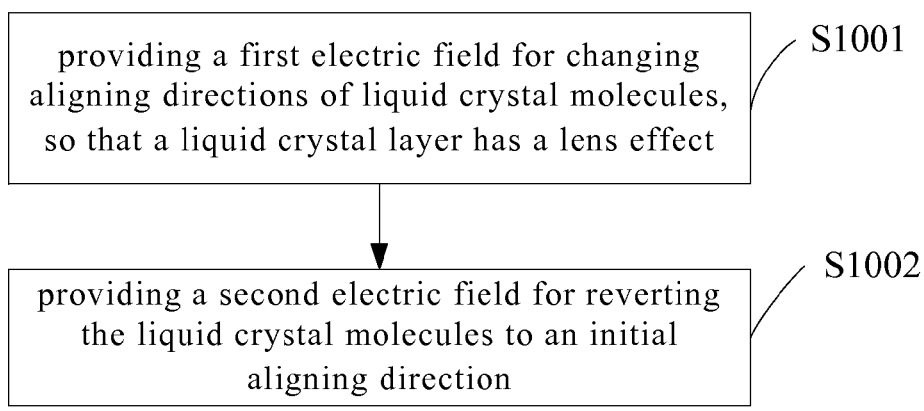
FIG. 10 is a flowchart of a controlling method of a liquid crystal lens according to the present disclosure.

Referring to FIG. 10, a flowchart of a controlling method of the liquid crystal lens according to the present disclosure is shown.

In step S1001, a first electric field is provided for changing aligning directions of a plurality of liquid crystal molecules in a liquid crystal layer to make the liquid crystal layer into a first state under which the liquid crystal layer has a lens effect;

In step S1002, a second electric field is provided for reverting the liquid crystal molecules to an initial aligning direction in which the liquid crystal layer have a non-lens effect.

Preferably, the field direction of the second electric field is at least partly parallel to the initial aligning direction of the liquid crystal molecules, and the initial aligning direction is an aligning direction of the liquid crystal molecules when any electric field is not provided.

In the above embodiments, the liquid crystal molecules revent to the initial aligning direction which is decided by the aligning layers under the second electric field, but the present disclosure is not limited thereto.

In other embodiments, the liquid crystal molecules are made into a first aligning state by the first electric field. Here, the liquid crystal molecules are in a first optical state under which the liquid crystal layer has the lens effect. The liquid crystal molecules are made into a second aligning state by the second electric field. Here, the liquid crystal molecules are in a second optical state under which the liquid crystal layer has the non-lens effect. It is noted that the second electric field is not limited to revert the aligning directions of the liquid crystal molecules to the initial aligning direction without any electric field in the other embodiments. That is to say, the second electric field may also make the liquid crystal molecules into other aligning states, as long as the lens effect of the liquid crystal layer can be eliminated and lights may be transmitted in original directions. Any aligning states under which the liquid crystal has a non-lens state should be included in the spirit of the present disclosure.

A specific process of the controlling method of the liquid crystal lens may refer to the description above mentioned in connection with the first preferable embodiment, the second preferable embodiment and the third preferable embodiment.

The present disclosure further provides a 3-Dimensional (3D) displaying apparatus including the above liquid crystal lens. Specifically, the liquid crystal lens includes a pair of electrode structures arranged apart from each other, and a liquid crystal layer arranged between the pair of electrode structures. The liquid crystal layer includes a plurality of liquid crystal molecules aligned in an initial aligning direction.

In practice, the electrode structures of the liquid crystal lens in the 3D displaying apparatus create a first electric field for changing aligning directions of the liquid crystal molecules, so that the liquid crystal layer has the lens effect. The electrode structure may further create a second electric field for reverting the liquid crystal molecules to the initial aligning direction. In the initial aligning direction, the liquid crystal layer has a non-lens effect.

Since the liquid crystal lens for the 3D displaying apparatus has been described above, it is not repeated here.

The embodiments of the present disclosure greatly reduce the response time of the liquid crystal lens, and more particularly reduce the response time during which the liquid crystal molecules of the liquid crystal layer revert to a state of non-lens effect. Thus, an efficiency of the liquid crystal lens is improved, and it is advantageous to popularize the liquid crystal lens.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal lens, comprising:
a pair of electrode structures functioned to generate a first electric field and a second electric field; and
a liquid crystal layer arranged between the pair of electrode structures and comprising a plurality of liquid crystal molecules aligned in an initial aligning direction, wherein the second electric field has a field direction which is at least partially parallel to the initial aligning direction, so that the liquid crystal molecules rapidly revert to the initial aligning direction under the second electric field;

wherein the first electric field changes aligning directions of the liquid crystal molecules to make the liquid crystal layer have a lens effect; and the second electric field promotes the liquid crystal molecules substantially back to the initial aligning direction having no-lens effect;

wherein the pair of electrode structures comprise a first electrode structure and a second electrode structure, the first electrode structure comprises a plurality of first strip electrodes which are arranged apart from each other and extend in a first extending direction, and the second electrode structure comprises a plurality of second strip electrodes which are arranged apart from each other and extend in a second extending direction which is parallel to the first extending direction.

2. The liquid crystal lens according to claim 1, wherein the first electric field is generated by providing a voltage difference between the pair of electrode structures, the voltage difference comprises an overdrive voltage difference and a stabilizing voltage difference which makes the liquid crystal layer create the lens effect.

3. The liquid crystal lens according to claim 1, wherein the first electric field is generated by providing a voltage difference between the first strip electrodes and the second strip electrodes.

4. The liquid crystal lens according to claim 1, wherein the second electric field is generated by providing a voltage difference between the first strip electrodes or between the second strip electrodes, or both between the first strip electrodes and between the second strip electrodes.

5. The liquid crystal lens according to claim 1, wherein the first electrode structure further comprises a plurality of first high resistance material layers arranged between the first strip electrodes, and/or the second electrode structure further comprises a plurality of second high resistance material layers arranged between the second strip electrodes.

6. The liquid crystal lens according to claim 1, wherein the initial aligning direction is across to the first extending direction.

7. The liquid crystal lens according to claim 1, wherein the liquid crystal lens further comprises a first aligning layer and a second aligning layer, and the first aligning layer and the second aligning layer are arranged cooperatively to make the liquid crystal molecules be aligned in the initial aligning direction.

8. The liquid crystal lens according to claim 1, wherein the second electrode structure further comprises a planar electrode, the planar electrode and the second strip electrodes are stacked with and insulated from each other, the second electric field is generated by providing a voltage difference between the second strip electrodes and the planar electrode.

9. A controlling method of a liquid crystal lens, comprising:
providing a first electric field which is used to make a plurality of liquid crystal molecules in a liquid crystal layer into a first aligning state under which the liquid crystal layer has a lens effect; and
providing a second electric field which is used to make the liquid crystal molecules into a second aligning state under which the liquid crystal layer has a non-lens effect;
wherein the second electric field has a field direction which is at least partially parallel to an initial aligning direction of the liquid crystal molecules, so that the liquid crystal molecules rapidly revert to the initial aligning direction under the second electric field;
wherein the first electric field and the second electric field are generated by a pair of electrode structures, the pair of electrode structures comprise a first electrode structure and a second electrode structure, the first electrode structure comprises a plurality of first strip electrodes which are arranged apart from each other and extend in a first extending direction, and the second electrode structure comprises a plurality of second strip electrodes which are arranged apart from each other and extend in a second extending direction which is parallel to the first extending direction.

10. A 3-Dimensional (3D) display comprising a liquid crystal lens, wherein the liquid crystal lens comprises:
a pair of electrode structures; and
a liquid crystal layer which is arranged between the pair of electrode structures and comprises a plurality of liquid crystal molecules arranged in an initial aligning direction in which the liquid crystal layer has a non-lens effect;
wherein the pair of electrode structures are arranged to generate a first electric field which is used to change aligning directions of the liquid crystal molecules to make the liquid crystal layer have a lens effect; and
the pair of electrode structures are further arranged to generate a second electric field which is used to make the liquid crystal molecules rapidly revert to the initial aligning direction, wherein the second electric field has a field direction which is at least partially parallel to the initial aligning direction;
wherein the pair of electrode structures comprise a first electrode structure and a second electrode structure, the first electrode structure comprises a plurality of first strip electrodes which are arranged apart from each other and extend in a first extending direction, and the second electrode structure comprises a plurality of second strip electrodes which are arranged apart from each other and extend in a second extending direction which is parallel to the first extending direction.

11. A liquid crystal lens, comprising:
a first electrode structure comprising a plurality of first strip electrodes extending in a first extending direction;
a second electrode structure comprising a plurality of second strip electrodes extending in a second extending direction which is parallel to the first extending direction; a liquid crystal layer which is arranged between the first electrode structure and the second electrode structure, and comprises a plurality of liquid crystal molecules aligned in an initial aligning direction in which the liquid crystal layer has a non-lens effect; and
an electric field which has a field direction at least partially parallel to the initial aligning direction, wherein the electric field is generated between the first strip electrodes and/or between the second strip electrodes, so that the liquid crystal molecules rapidly revert to the initial aligning direction under the electric field.

12. The liquid crystal lens according to claim 11, wherein the first electrode structure further comprises a plurality of first high resistance material layers arranged between the first strip electrodes, and/or the second electrode structure further comprises a plurality of second high resistance material layers arranged between the second strip electrodes.

* * * * *